(12) United States Patent
Cowen et al.

(10) Patent No.: US 9,482,333 B2
(45) Date of Patent: Nov. 1, 2016

(54) SPROCKET ASSEMBLY INCLUDING TEETH HAVING AN ENLARGED PROFILE

(71) Applicant: Schaeffler Technologies GmbH & Co. KG, Herzogenaurach (DE)

(72) Inventors: Gregory Cowen, Windsor (CA); Jesse Myers, Waterford, MI (US); Anuj Sahai, Rochester Hills, MI (US); Lucian Botez, Novi, MI (US); Jeffrey Hewitt, Windsor (CA)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 178 days.

(21) Appl. No.: 14/538,231

(22) Filed: Nov. 11, 2014

(65) Prior Publication Data
US 2015/0141183 A1 May 21, 2015

Related U.S. Application Data

(60) Provisional application No. 61/904,863, filed on Nov. 15, 2013.

(51) Int. Cl.
*F16H 55/08* (2006.01)
*F16H 55/30* (2006.01)
*F16H 7/06* (2006.01)

(52) U.S. Cl.
CPC ........... *F16H 55/08* (2013.01); *F16H 7/06* (2013.01); *F16H 55/30* (2013.01); *F16H 2055/086* (2013.01)

(58) Field of Classification Search
CPC .... F16H 2055/86; F16H 55/08; F16H 55/30; F16H 7/06
USPC .................................................. 474/152, 157
See application file for complete search history.

(56) References Cited

U.S. PATENT DOCUMENTS

| | | | |
|---|---|---|---|
| 6,416,436 B1 | 7/2002 | Kanehira et al. | |
| 8,118,699 B2 * | 2/2012 | Sakura | F16H 55/08 474/152 |
| 2003/0027675 A1 | 2/2003 | Suzuki et al. | |
| 2006/0068959 A1 | 3/2006 | Young et al. | |
| 2006/0135304 A1 * | 6/2006 | Sonoda | F16H 55/08 474/152 |
| 2007/0155564 A1 | 7/2007 | Ledvina et al. | |
| 2008/0070732 A1 | 3/2008 | Ledvina | |
| 2008/0312019 A1 * | 12/2008 | Ogo | F16H 55/08 474/212 |
| 2010/0227720 A1 | 9/2010 | Mehta et al. | |
| 2011/0021299 A1 | 1/2011 | Young et al. | |
| 2011/0245002 A1 | 10/2011 | Young | |
| 2011/0271780 A1 * | 11/2011 | Ikemura | F16H 55/08 74/458 |
| 2016/0138698 A1 * | 5/2016 | Cowen | F16H 57/0431 474/91 |

* cited by examiner

*Primary Examiner* — William E Dondero
*Assistant Examiner* — Robert T Reese
(74) *Attorney, Agent, or Firm* — Volpe and Koenig, P.C.

(57) ABSTRACT

A chain and sprocket drive system that includes an inverted tooth chain assembly configured to mesh with a laminated sprocket assembly is provided. The inverted tooth chain assembly includes a plurality of rows of links. The laminated sprocket assembly includes a plurality of plates, each of the plates including a plurality of teeth that are aligned with adjacent teeth. Each tooth has an engaging flank and a disengaging flank. The engaging flank of the teeth on one of the plurality of plates has an enlarged profile in a radially outwardly extending direction in comparison to corresponding ones of the teeth of an adjacent one of the plates, such that a first contact position with a link of the chain assembly carried thereon is located radially outward from a second contact position of the link with the corresponding teeth of the adjacent one of the plurality of plates.

9 Claims, 5 Drawing Sheets

SPROCKET ASSEMBLY INCLUDING TEETH HAVING AN ENLARGED PROFILE

INCORPORATION BY REFERENCE

The following documents are incorporated herein by reference as if fully set forth: U.S. Provisional Patent Application No. 61/904,863, filed Nov. 15, 2013.

FIELD OF INVENTION

This application is generally related to a sprocket assembly and is more particularly related to an improved laminated sprocket assembly.

BACKGROUND

In the field of automotive engines, sprockets are used in connection with timing chains and timing drives, and for various other purposes. Teeth or other driving surfaces are formed around the periphery of the sprockets to carry a chain or drive assembly having pockets in which the teeth of the sprocket are engaged. During operation, the sprocket teeth mesh with chain, and the contact of the advancing teeth engaging the chain links creates noise. In known sprocket and chain drive systems, contact between the links and sprocket teeth occurs along a common contact line. It would be desirable to reduce the noise caused by meshing of the sprocket and chain assemblies while still providing the required load carrying capabilities.

SUMMARY

A chain and sprocket drive system that alters the contact positions between chain and sprocket assemblies is provided. The drive system includes an inverted tooth chain assembly configured to mesh with a sprocket assembly. The inverted tooth chain assembly includes a plurality of rows of links. The drive system also includes a laminated sprocket assembly including a plurality of plates, each of the plates including a plurality of teeth. The teeth of adjacent plates are aligned with one another. Each of the teeth have an engaging flank, a disengaging flank, a tip interconnecting the engaging flank and the disengaging flank, and a root located between adjacent teeth of the plurality of teeth. The engaging flank of the teeth on one of the plurality of plates has an enlarged profile in a radially outwardly extending direction in comparison to corresponding ones of the teeth of an adjacent one of the plates, such that a first contact position with a link of the chain assembly carried thereon is located radially outward from a second contact position of the link with the corresponding teeth of the adjacent one of the plurality of plates. The enlarged profile of the teeth causes staggering among contact positions of the chain assembly as it meshes with the sprocket assembly.

A laminated sprocket assembly configured to mesh with an inverted tooth chain assembly including a plurality of links is also provided. The laminated sprocket assembly includes a plurality of plates, each of the plates including a plurality of teeth. The teeth of adjacent plates are aligned with one another. Each of the teeth have an engaging flank, a disengaging flank, a tip interconnecting the engaging flank and the disengaging flank, and a root located between adjacent teeth of the plurality of teeth. The engaging flank of the teeth on one of the plurality of plates has an enlarged profile in a radially outwardly extending direction in comparison to corresponding ones of the teeth of an adjacent one of the plates. The enlarged profile causes a first contact position with a link of a chain assembly carried thereon to be located radially outward from a second contact position of the link with the corresponding teeth of the adjacent one of the plurality of plates.

Preferred arrangements with one or more features of the invention are described below and in the claims.

BRIEF DESCRIPTION OF THE DRAWINGS

The foregoing Summary as well as the following Detailed Description will be best understood when read in conjunction with the appended drawings. In the Drawings.

DETAILED DESCRIPTION OF THE PREFERRED EMBODIMENTS

Figure 1:
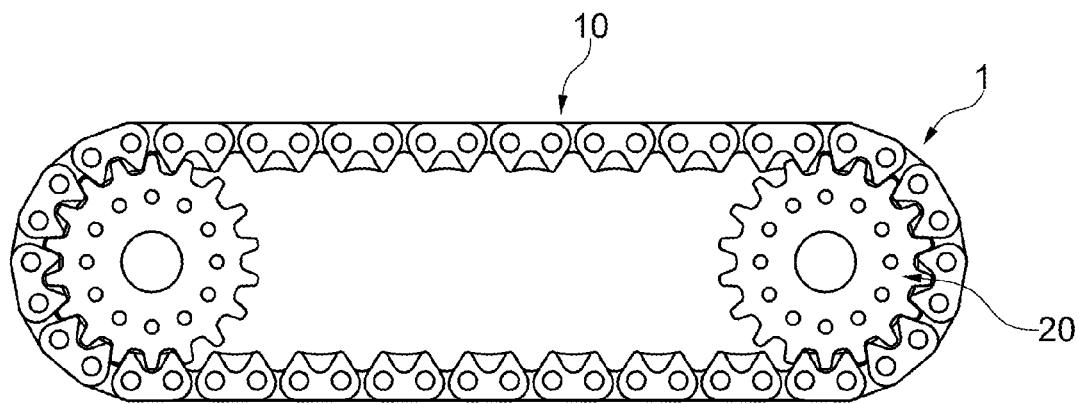
FIG. 1 is a front plan view of an exemplary chain and sprocket drive system.

Certain terminology is used in the following description for convenience only and is not limiting. The words "inner," "outer," "inwardly," and "outwardly" refer to directions towards and away from the parts referenced in the drawings. A reference to a list of items that are cited as "at least one of a, b, or c" (where a, b, and c represent the items being listed) means any single one of the items a, b, or c, or combinations thereof. The terminology includes the words specifically noted above, derivates thereof, and words of similar import.

Figure 2:
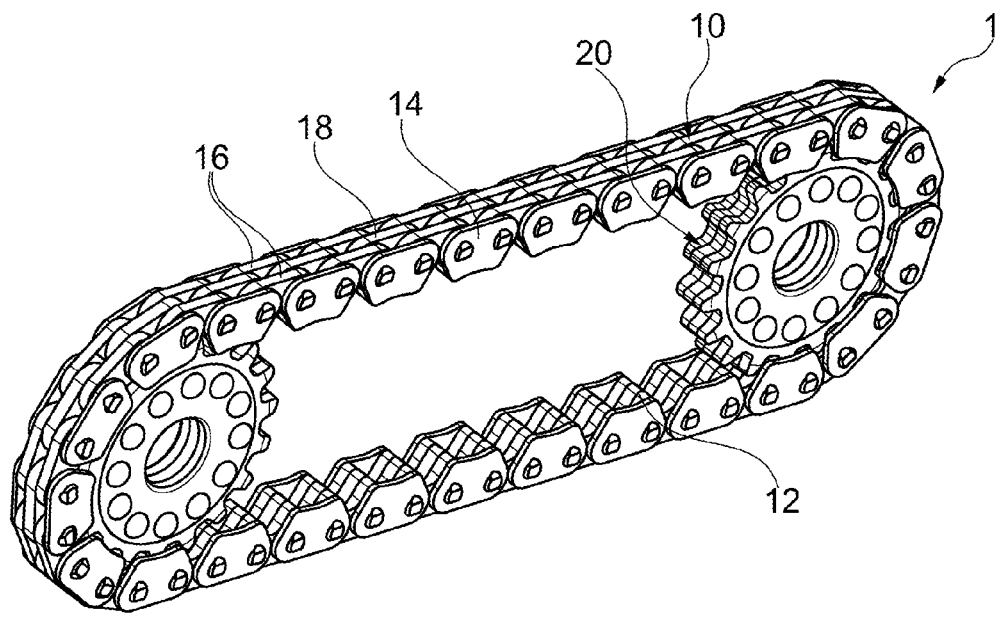
FIG. 2 is a perspective view of chain and sprocket drive system of FIG. 1.

FIGS. 1 and 2 show an embodiment of a chain and laminated sprocket drive system 1. The chain assembly 10 preferably is an inverted tooth chain with a plurality of rows of links 12. Guide plates 14 are provided on axial ends of the inverted tooth chain. The inverted tooth chain includes outer links 16 and inner links 18 between the guide plates 14. The inverted tooth chain includes chain pins 19, and the plurality of rows of links 12 articulate relative to adjacent rows of links about a respective chain pin. In one embodiment, the outer links 16 and inner links 18 have a uniform profile.

Figure 3:
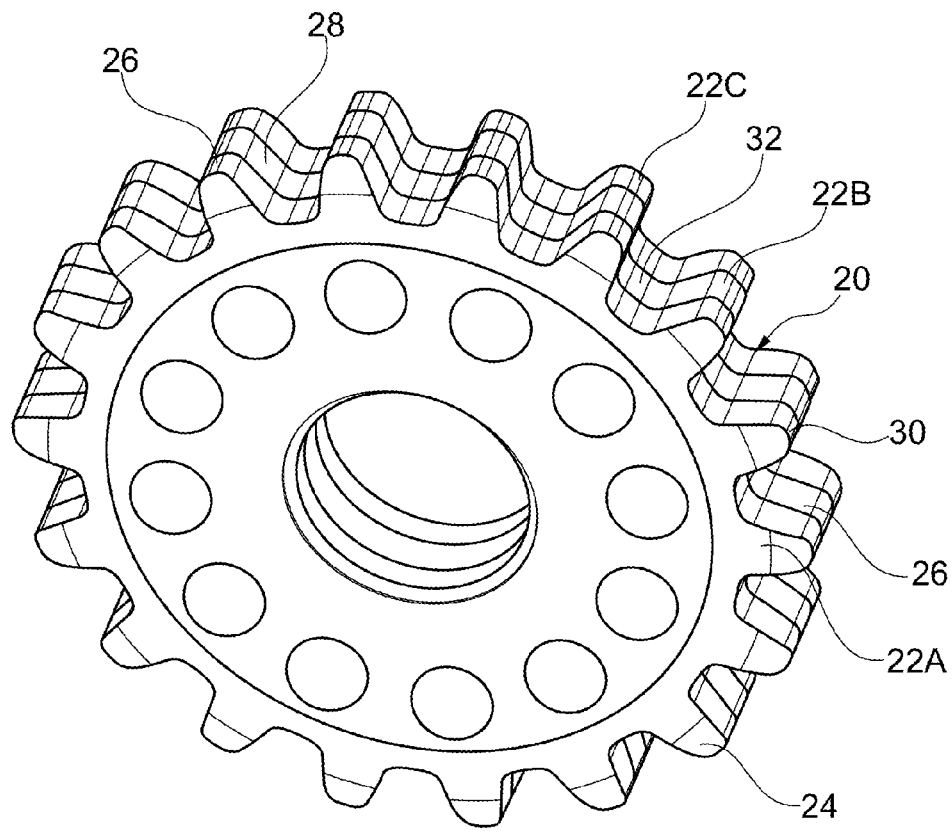
FIG. 3 is a perspective view of a laminated sprocket assembly.

As shown in FIG. 3, the sprocket assembly 20 is a laminated sprocket including a plurality of plates 22A-C. Each of the plates 22A-C includes a plurality of teeth 24, and the teeth of adjacent plates 22A-C are aligned with one another. Each tooth includes an engaging flank 26 and a disengaging flank 28. The flanks 26, 28 engage the links of the chain assembly 10 during meshing. Each tooth includes a tip 30 that interconnects the engaging flank 26 and the disengaging flank 28, and a root 32 located between adjacent teeth.

Figure 4:
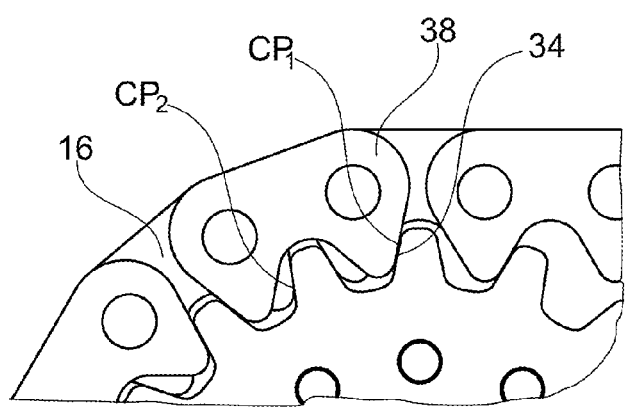
FIG. 4 is a magnified view showing two contact positions of a chain assembly with a laminated sprocket assembly.
Figure 5A:
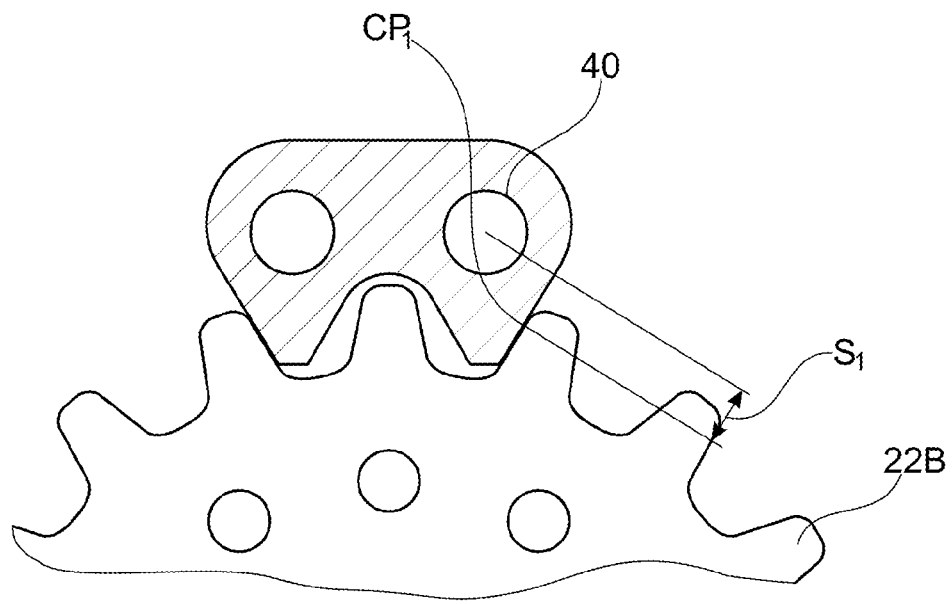
FIG. 5A is a magnified view showing a link of the chain assembly contacting a plate with an enlarged tooth profile.
Figure 5B:
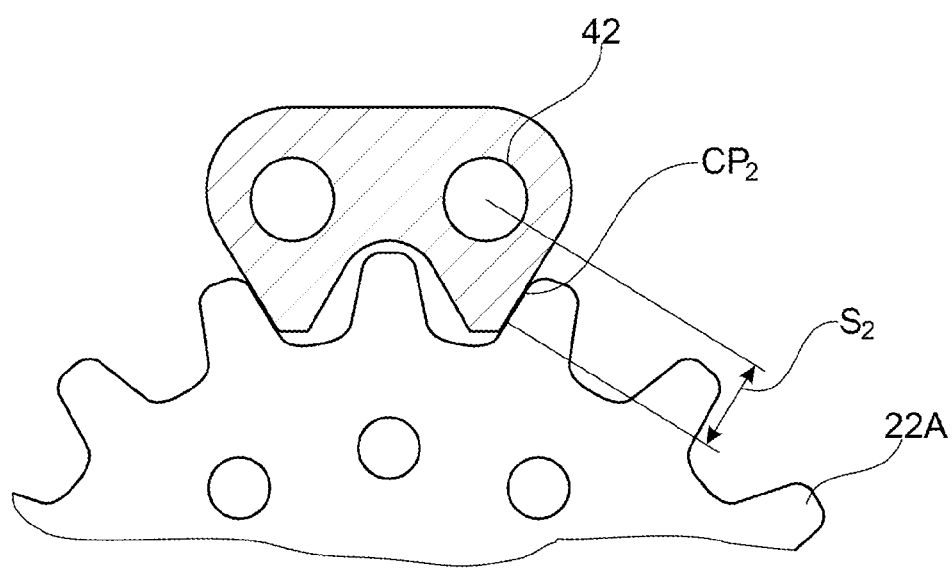
FIG. 5B is a magnified view showing a link of the chain assembly contacting a plate with a conventional tooth profile.

As shown in FIGS. 4, 5A, 5B and 6, the engaging flank 34 of the teeth on one of the plurality of plates 22B has an enlarged profile 36 in a radially outwardly extending direction in comparison to corresponding teeth of an adjacent one of the plates 22A, 22C. In a preferred embodiment, teeth on an inner plate 22B include the enlarged profile 36. One of ordinary skill in the art recognizes that teeth 24 on any one or multiple ones of the plurality of plates 22A-C can include the enlarged profile 36. As shown in FIG. 4, the teeth 24 with the enlarged profile 36 cause a first contact position $CP_1$ with a link of the chain assembly 10 carried thereon to be located radially outwardly from a second contact position $CP_2$ of the link with the corresponding teeth of the adjacent one of the plurality of plates 22A, 22C. The corresponding teeth 24 of the adjacent one of the plurality of plates 22A, 22C have a conventional tooth profile. As shown in FIGS. 5A and 5B, a distance $S_1$ between a center of a first chain pin 40 of the chain assembly 10 and the first contact position $CP_1$ is less than a distance $S_2$ between a center of a second chain pin 42 and the second contact position $CP_2$. A chain pitch P is defined as the distance between centers of adjacent chain pins. In this embodiment, the chain pitch P is defined as the distance between a center of the first chain pin 40 and a center of the second chain pin 42. In a preferred embodiment, a distance between the first contact position $CP_1$ and the second contact position $CP_2$ is approximately 10%-40% of the chain pitch P. Preferably, the difference in the distances $S_1$ and $S_2$ is approximately 10%-40% of the chain pitch P.

Figure 6:
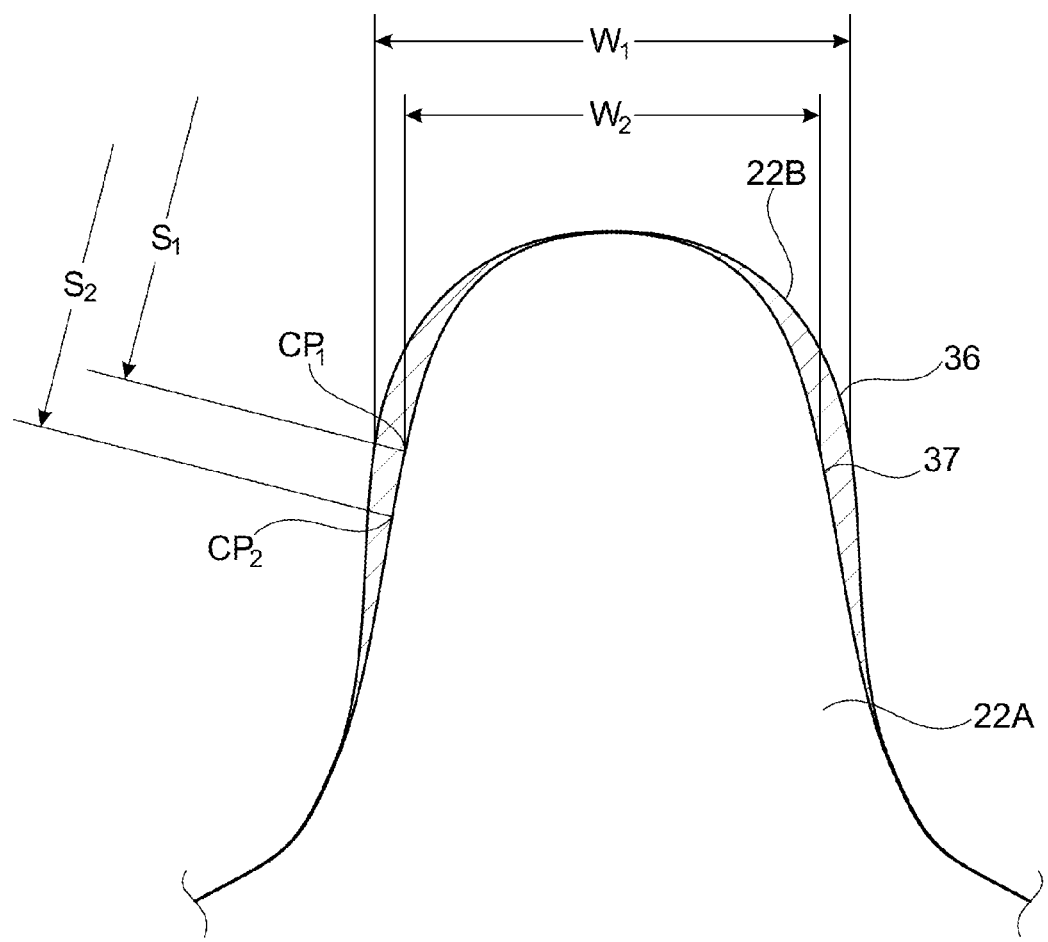
FIG. 6 shows a comparison of teeth with differing profiles according to one embodiment.

As shown in FIG. 6, which is an exaggerated representation of the profiles of the teeth, the teeth having the enlarged profile 36 preferably have a width $W_1$ at the first contact position $CP_1$ that is approximately 0.01 mm to 0.1 mm wider than a width $W_2$ of the teeth of the adjacent one of the plurality of plates 22A, 22C at the first contact position $CP_1$. The profiles of both the teeth having the enlarged profile 36 and the teeth having the conventional profile 37 converge at the respective roots 32.

Figure 7:
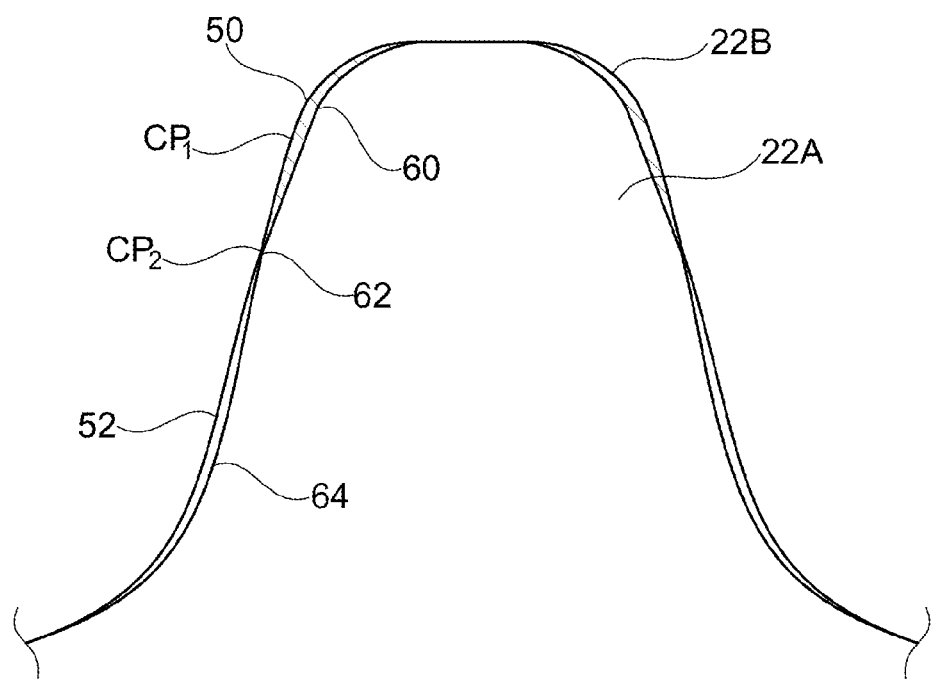
FIG. 7 shows comparison of teeth with differing profiles according to another embodiment.

FIG. 7 illustrates another embodiment of teeth of adjacent sprocket plates. The profiles shown in FIG. 7 are exaggerated to more clearly show the features of the profiles. In this embodiment, a tooth 50 on one of the plurality of plates 22B has an enlarged profile in a first region 60 of the engaging flank 26 located adjacent to the tooth tip 30, and a corresponding tooth 52 on an adjacent one of the plurality of plates 22A has a conventional profile in the first region 60. In a preferred embodiment, the tooth 50 on plate 22B has a width in the first region 60 that is approximately 0.01 mm to 0.1 mm wider than the tooth 52 on plate 22A in the first region 60. In a medial region 62 of the engaging flank 26, both teeth 50, 52 have the same profile, and the profiles of the teeth 50, 52 converge at the medial region 62. The tooth 52 on plate 22A has an enlarged profile in a second region 64 of the engaging flank 26 located adjacent to the root 32, and the tooth 50 on plate 22B has a smaller profile in the second region 64. The profiles of the teeth 50, 52 converge at the root 32. In a preferred embodiment, the tooth 50 on plate 22B has a width in the second region 62 that is approximately 0.01 mm to 0.1 mm wider than the tooth 52 on plate 22A in the second region 62. Because the enlarged profiles of the teeth 50, 52 are radially offset from each other, the links on the chain assembly mesh with the teeth 50, 52 at radially offset contact positions. A first contact position $CP_1$ of the tooth 50 on plate 22B is located radially outwardly from a second contact position $CP_2$ of the tooth 52 on plate 22A.

Having thus described various embodiments of the present chain and sprocket drive system in detail, it is to be appreciated and will be apparent to those skilled in the art that many physical changes, only a few of which are exemplified in the detailed description above, could be made in the apparatus without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

LOG TO REFERENCE NUMBERS

1. Sprocket and Chain Drive System
10. Chain Assembly
12. Plurality of Rows of Links
14. Guide Plates
16. Outer Links
18. Inner Links
19. Chain Pins
20. Sprocket Assembly
22A-C. Sprocket Plates
24. Sprocket Teeth
26. Engaging Flank
28. Disengaging Flank
30. Tip
32. Root
34. Engaging Flank with Enlarged Profile
36. Enlarged Profile
37. Conventional Profile
38. Link Engaged by Tooth with Enlarged Profile
40. First Chain Pin
42. Second Chain Pin
50. Tooth on Plate 22B
52. Tooth on Plate 22A
60. First Region
62. Medial Region
64. Second Region
$CP_1$—First Contact Position
$CP_2$—Second Contact Position
$W_1$—Width of Tooth with Enlarged Profile at First Contact Position
$W_2$—Width of Tooth with Conventional Profile at First Contact Position
$S_1$—Distance between First Chain Pin Center and First Contact Position
$S_2$—Distance between Second Chain Pin Center and Second Contact Position

What is claimed is:
1. A chain and sprocket drive system comprising:
an inverted tooth chain assembly configured to mesh with a sprocket assembly, the inverted tooth chain assembly including a plurality of rows of links,
a laminated sprocket assembly including a plurality of plates, each of the plates including a plurality of teeth, the teeth of adjacent plates being aligned with one another,
each of the teeth having an engaging flank, a disengaging flank, a tip interconnecting the engaging flank and the disengaging flank, and a root located between adjacent teeth of the plurality of teeth,
the engaging flank of the teeth on one of the plurality of plates has an enlarged profile in a radially outwardly extending direction in comparison to corresponding ones of the teeth of an adjacent one of the plates, such that a first contact position with a link of the chain assembly carried thereon is located radially outward from a second contact position of the link with the corresponding teeth of the adjacent one of the plurality of plates.

2. The chain and sprocket drive system of claim 1, wherein links of the plurality of rows of links have a uniform profile.

3. The chain and sprocket drive system of claim 1, wherein the laminated sprocket assembly includes an inner plate and two outer plates, and the inner plate includes the teeth having the enlarged profile.

4. The chain and sprocket drive system of claim 1, wherein the inverted tooth chain assembly includes chain pins, and the plurality of rows of links articulate relative to adjacent rows of links about the respective chain pin.

5. The chain and sprocket drive system of claim 4, wherein a distance between a center of a first chain pin and the first contact position is less than a distance between a center of a second chain pin and the second contact position.

6. The chain and sprocket drive system of claim 5, wherein a distance between the first contact position and the second contact position is approximately 10%-40% of a chain pitch.

7. A laminated sprocket assembly configured to mesh with an inverted tooth chain assembly including a plurality of links, the laminated sprocket assembly comprising:

a plurality of plates, each of the plates including a plurality of teeth, the teeth of adjacent plates being aligned with one another, each of the teeth having an engaging flank, a disengaging flank, a tip interconnecting the engaging flank and the disengaging flank, and a root located between adjacent teeth of the plurality of teeth, the engaging flank of the teeth on one of the plurality of plates has an enlarged profile in a radially outwardly extending direction in comparison to corresponding teeth of an adjacent one of the plates, such that a first contact position with a link of a chain assembly carried thereon is located radially outward from a second contact position of the link with the corresponding teeth of the adjacent one of the plurality of plates.

8. The laminated sprocket assembly of claim 7, wherein the plurality of plates is comprised of an inner plate and two outer plates, and the inner plate includes the teeth having the enlarged profile.

9. The laminated sprocket assembly of claim 7, wherein a distance between the first contact position of the link and the second contact position of the link is approximately 10%-40% of a chain pitch.

* * * * *